US009832783B2

(12) United States Patent
Shah

(10) Patent No.: US 9,832,783 B2
(45) Date of Patent: *Nov. 28, 2017

(54) SELECTING FIRST OR SECOND SUBSCRIBER IDENTITY MODULE BASED ON PRIORITY

(71) Applicant: Intel Deutschland GmbH, Neubiberg (DE)

(72) Inventor: Manthan Shah, Bangalore (IN)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,776

(22) Filed: Dec. 13, 2016

(65) Prior Publication Data

US 2017/0127432 A1    May 4, 2017

Related U.S. Application Data

(63) Continuation of application No. 13/870,010, filed on Apr. 25, 2013, now Pat. No. 9,544,418.

(51) Int. Cl.
*H04W 88/06* (2009.01)
*H04W 48/18* (2009.01)
(Continued)

(52) U.S. Cl.
CPC ............. *H04W 72/10* (2013.01); *H04W 4/16* (2013.01); *H04W 48/18* (2013.01); *H04W 88/06* (2013.01)

(58) Field of Classification Search
CPC ..... H04W 88/06; H04W 8/183; H04W 48/16; H04W 8/18; H04W 48/18; H04W 4/16;
(Continued)

(56) References Cited

U.S. PATENT DOCUMENTS 9,544,418 B2 * 1/2017 Shah ................. H04M 1/72563
2013/0012135 A1   1/2013 Ruohonen et al.

FOREIGN PATENT DOCUMENTS

CN      102461326 A      5/2012
CN      102845124 A      12/2012
(Continued)

OTHER PUBLICATIONS

Chinese Office Action based on Application No. 201410246549.9 (7 Pages) dated Mar. 27, 2017 (Reference Purpose Only).

*Primary Examiner* — Philip Sobutka
(74) *Attorney, Agent, or Firm* — Viering, Jentschura & Partner mbB

(57) ABSTRACT

A communication device may be provided. The communication device may include a first communication circuit configured to perform a first communication activity; a second communication circuit configured to perform a second communication activity; a priority weight determination circuit configured to determine a first priority weight based on an activity history of the first communication circuit and configured to determine a second priority weight based on an activity history of the second communication circuit; and a resource distribution circuit configured to determine based on the first priority weight and based on the second priority weight whether the first communication circuit shall perform the first communication activity at a pre-determined point in time or whether the second communication circuit shall perform the second communication activity at the pre-determined point in time.

22 Claims, 4 Drawing Sheets

(51) Int. Cl.
*H04W 4/16* (2009.01)
*H04W 72/02* (2009.01)
*H04W 72/10* (2009.01)

(58) Field of Classification Search
CPC ... H04W 76/025; H04W 72/02; H04W 76/02;
H04W 76/026
USPC ............ 455/552.1, 558, 435.2, 435.3, 452.1,
455/452.2
See application file for complete search history.

(56) References Cited

FOREIGN PATENT DOCUMENTS

| WO | 2010140781 A2 | 12/2010 |
| WO | 2011092254 A1 | 8/2011 |
| WO | 2012122305 A1 | 9/2012 |
| WO | 2013035065 A1 | 3/2013 |

\* cited by examiner

SELECTING FIRST OR SECOND SUBSCRIBER IDENTITY MODULE BASED ON PRIORITY

CROSS-REFERENCE TO RELATED APPLICATION

This application claims priority to U.S. patent application Ser. No. 13/870,010, which was filed Apr. 25, 2013, and is incorporated herein by reference in its entirety.

TECHNICAL FIELD

Aspects of this disclosure relate generally to communication devices and methods for controlling a communication device.

BACKGROUND

Communication devices may be configured to perform various communication activities. However, it may not be possible to perform two activities at a time, and it may be desired to decide on which activity the communication device should perform.

SUMMARY

A communication device may include a first communication circuit configured to perform a first communication activity; a second communication circuit configured to perform a second communication activity; a priority weight determination circuit configured to determine a first priority weight based on an activity history of the first communication circuit and configured to determine a second priority weight based on an activity history of the second communication circuit; and a resource distribution circuit configured to determine based on the first priority weight and based on the second priority weight whether the first communication circuit shall perform the first communication activity at a pre-determined point in time or whether the second communication circuit shall perform the second communication activity at the pre-determined point in time. The activity history of the first communication circuit may include information on the first communication activity performed by the first communication circuit at a first plurality of points in time preceding the pre-determined point in time. The activity history of the second communication circuit may include information on the second communication activity performed by the second communication circuit at a second plurality of points in time preceding the pre-determined point in time.

A method for controlling a communication device may include: determining a first priority weight based on an activity history of a first communication circuit of the communication device; determining a second priority weight based on an activity history of a second communication circuit of the communication device; and determining based on the first priority weight and based on the second priority weight whether the first communication circuit shall perform a first communication activity at a pre-determined point in time or whether the second communication circuit shall perform a second communication activity at the pre-determined point in time. The activity history of the first communication circuit may include information on the first communication activity performed by the first communication circuit at a first plurality of points in time preceding the pre-determined point in time. The activity history of the second communication circuit may include information on the second communication activity performed by the second communication circuit at a second plurality of points in time preceding the pre-determined point in time.

A communication device may include: a resource distribution circuit configured to determine based on a first activity history, including information on a communication activity of a first communication circuit at a first plurality of points in time, and based on a second activity history, including information on a communication activity of a second communication circuit at a second plurality of points in time, whether the first communication circuit shall perform the first communication activity or whether the second communication circuit shall perform the second communication activity.

A method for controlling a communication device may include: determining based on a first activity history, including information on a communication activity of a first communication circuit at a first plurality of points in time, and based on a second activity history, including information on a communication activity of a second communication circuit at a second plurality of points in time, whether the first communication circuit shall perform the first communication activity or whether the second communication circuit shall perform the second communication activity.

BRIEF DESCRIPTION OF THE DRAWINGS

In the drawings, reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which.

DESCRIPTION

Figure 1:
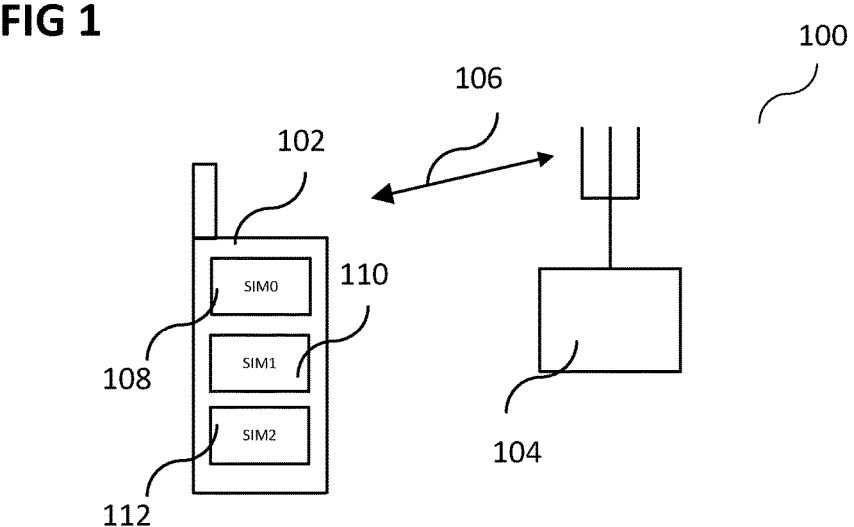
FIG. 1 shows a mobile radio communication system.

The following detailed description refers to the accompanying drawings that show, by way of illustration, specific details and aspects of the disclosure in which the invention may be practiced. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A communication device may be a radio communication device. A radio communication device may be an end-user mobile device (MD). A radio communication device may be any kind of radio communication terminal, mobile radio communication device, mobile telephone, personal digital assistant, mobile computer, or any other mobile device configured for communication with another radio communication device, a mobile communication base station (BS) or an access point (AP) and may be also referred to as a User Equipment (UE), a mobile station (MS) or an advanced mobile station (advanced MS, AMS), for example in accordance with IEEE 802.16m.

A radio base station may be a radio base station operated by a network operator (which may also be referred to as a legacy base station), e.g. a NodeB or an eNodeB, or may be a home base station, e.g. a Home NodeB, e.g. a Home (e)NodeB. In an example, a 'Home NodeB' may be understood in accordance with 3GPP (Third Generation Partnership Project) as a trimmed-down version of a cellular mobile radio base station optimized for use in residential or corporate environments (e.g., private homes, public restaurants or small office areas). Femto-Cell Base Stations (FC-BS) may be provided in accordance with a 3GPP standard, but may also be provided for any other mobile radio communication standard, for example for IEEE 802.16m.

The communication device may include a memory which may for example be used in the processing carried out by the communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

A description is provided for devices, and description is provided for methods. It will be understood that basic properties of the devices also apply for the methods and vice versa. Therefore, for sake of brevity, duplicate descriptions of such properties may be omitted.

It will be understood that any property described herein for a specific device may also hold for any device described herein. It will be understood that any property described herein for a specific method may also hold for any method described herein.

Communication devices may be configured to perform various communication activities. However, it may not be possible to perform two activities at a time, and it may be desired to decide on which activity the communication device should perform.

FIG. 1 shows a radio communication system 100. A communication device, for example a mobile radio communication device 102, may exchange data with a radio base station 104 like indicated by arrow 106. The mobile radio communication device 102 may include portions which cannot operate in parallel for communication activities like sending data or receiving data. For example, the radio communication device 102 may include a first subscriber identity module SIM (which may be referred to as SIM0) 108, a second SIM (which may be referred to as SIM1) 110 and a third SIM (which may be referred to as SIM2) 112, which may not operate in parallel.

Although FIG. 1 shows a diagram illustrating communication between a mobile radio communication device to a network communication system, various devices and methods provided may also be applied in case of mobile radio communication device to mobile radio communication device communication (for example in an ad hoc network).

In a Multi-SIM (Single Mode/Multi Mode) Mobile Station (wherein SIM may be a subscriber identity module) with a single RF (radio frequency; for example a radio circuit or a radio frequency circuit), it may not possible be to receive a paging for different SIMs simultaneously if paging messages for different SIMs are scheduled at the same time. It will be understood that a paging message has a time duration, and if to paging messages overlap in time in any way, the problem described above may occur, not only if they are scheduled to start at the same time. However, a best effort approach may be adopted and the mobile station may receive as many pagings per SIM as possible. A method may be provided for deciding which SIM may receive a paging when multiple SIMs are expected to receive paging at the same time. Each SIM should get a fair amount of paging reception opportunities and consecutive loss of paging per SIM should be low, for example as low as possible, for example minimal.

A commonly used method for 2G (second generation) Dual SIM Dual Standby and 2G-3G (second generation-third generation) Dual SIM Dual Mode Dual standby solution may work based on a basic toggle mechanism or based on fixed priorities. When multiple SIMs are expected (or desired or scheduled) to receive paging at same time, this method may decide a SIM that should (or is allowed to) receive paging and next time the other SIM should receive paging if multiple paging are scheduled in same time.

Figure 2:
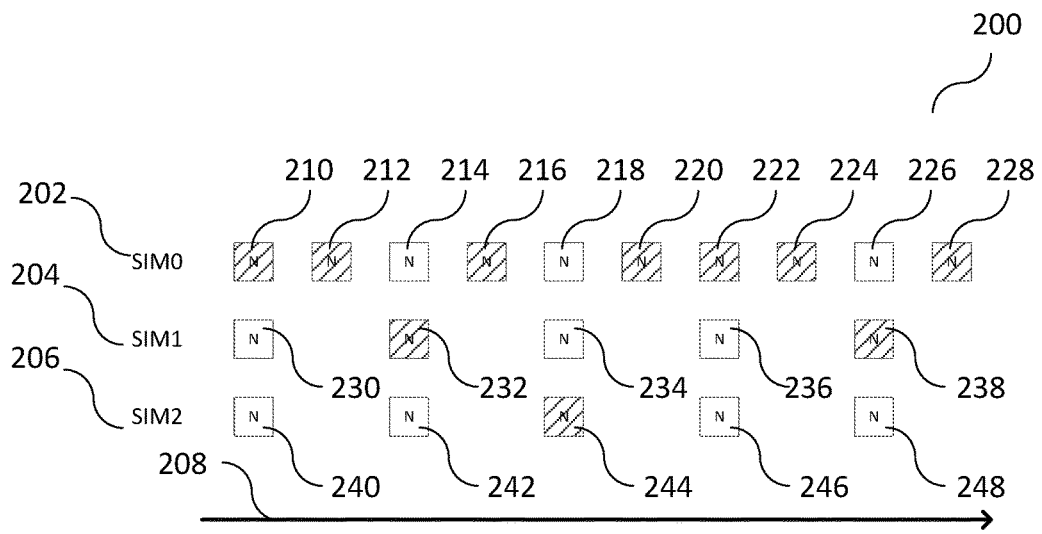
FIG. 2 shows a diagram illustrating resource distribution in a communication device using a toggle mechanism.

FIG. 2 shows a diagram 200 illustrating reception of pagings in a multi-SIM communication device (in other words: in a communication device which has a plurality of SIMs), for example a communication device with three SIMs. Time is shown as proceeding from left to right in FIG. 2, like indicated by arrow 208. Paging receptions for a first SIM (which may also be referred to as SIM0) of the communication device are shown in a first line indicated by 202. Paging receptions for a second SIM (which may also be referred to as SIM1) of the communication device are shown in a second line indicated by 204. Paging receptions for a third SIM (which may also be referred to as SIM2) of the communication device are shown in a third line indicated by 202. The first SIM may desire to receive pagings at the times indicated by boxes (labeled with 'N' which may stand for normal paging) in the first line (for example boxes 210, 212, 214, 216, 218, 220, 222, 224, 226, and 228). The second SIM may desire to receive pagings at the times indicated by boxes in the second line (for example boxes 230, 232, 234, 236, and 238). The third SIM may desire to receive pagings at the times indicated by boxes in the third line (for example boxes 240, 242, 244, 246, and 248). In FIG. 2, each of the boxes 210 to 248 may represent a time during which one of the SIMs of the communication device desires to receive a paging. An empty (or white) box may indicate that the SIM does actually not receive a paging, because another SIM receives a paging, and two SIMs may not receive a paging at the same time. A hatched box may indicate that the SIM actually receives the paging.

For the example shown in FIG. 2, the frequencies at which the SIMs are scheduled to receive pagings are different. For example the frequency of SIM0 may be ½ (for example with respect to a pre-determined timing schedule); in other words: SIM0 may be scheduled to receive pagings every second interval. The frequency of SIM1 may be ¼ (for example with respect to the pre-determined timing schedule); in other words: SIM1 may be scheduled to receive pagings every fourth interval. The frequency of SIM2 may be ¼ (for example with respect to the pre-determined timing schedule); in other words: SIM2 may be scheduled to receive pagings every fourth interval.

At times, when only one SIM desires to (or is scheduled to) receive a paging, this only one SIM may receive the paging. For example, SIM0 may be the only SIM desiring to receive pagings at times corresponding to the boxes 212, 216, 220, 224, and 228, and thus SIM0 may receive pagings at the times corresponding to the boxes 212, 216, 220, 224, and 228.

In the example shown in FIG. 2, for the time periods when more than one SIM desires to receive a paging, a toggle mechanism may be provided. In other words, in case more than one SIM desires to receive a paging, the SIMs may take turn to actually receive a paging. For example, at the first time shown in FIG. 2 during which all SIMs desire to receive a paging (like indicated by boxes 210, 230, and 240), SIM0 may receive the paging (like indicated by hatched box 210). The next time shown in FIG. 2 during which all SIMs desire to receive a paging (like indicated by boxes 214, 232, and 242), SIM1 may receive the paging (like indicated by hatched box 232). The next time shown in FIG. 2 during which all SIMs desire to receive a paging (like indicated by boxes 218, 234, and 244), SIM2 may receive the paging (like indicated by hatched box 244). The next time shown in FIG. 2 during which all SIMs desire to receive a paging (like indicated by boxes 222, 236, and 246), again SIM0 may receive the paging (like indicated by hatched box 222). The next time shown in FIG. 2 during which all SIMs desire to receive a paging (like indicated by boxes 226, 238, and 248), SIM1 may receive the paging (like indicated by hatched box 238). Thus, SIM0 is able to receive 66% of times its paging. SIM1 and SIM2 are receiving only 33% of times.

The toggling like described above may work for Dual-SIM in most of the scenarios. However, this method may not be fair for many scenarios. Furthermore, an extension to general Multi-SIM (for example with reception scheme not as periodic as for the example of FIG. 2) may be complex. A toggle mechanism may not sufficiently address many scenarios. Also simply counting number of paging loss may not be able to schedule in fair manner.

Devices and methods may be provided for scheduling paging reception for each SIM in a fair manner with minimal loss of paging per SIM.

Each SIM's paging may be given a priority weight, which may for example be a number. The decision of which SIM to choose in case where there are multiple SIMs expecting a paging reception, may be based on priority weights. The SIM with highest priority weight may be selected.

For example, a formula for determining a priority weight may be as follows:

$$W = L * F^{-1},$$

wherein W may be a priority weight, L may be the number of consecutive paging loss of the SIM, and F may be a frequency of paging reception of the SIM.

Figure 3:
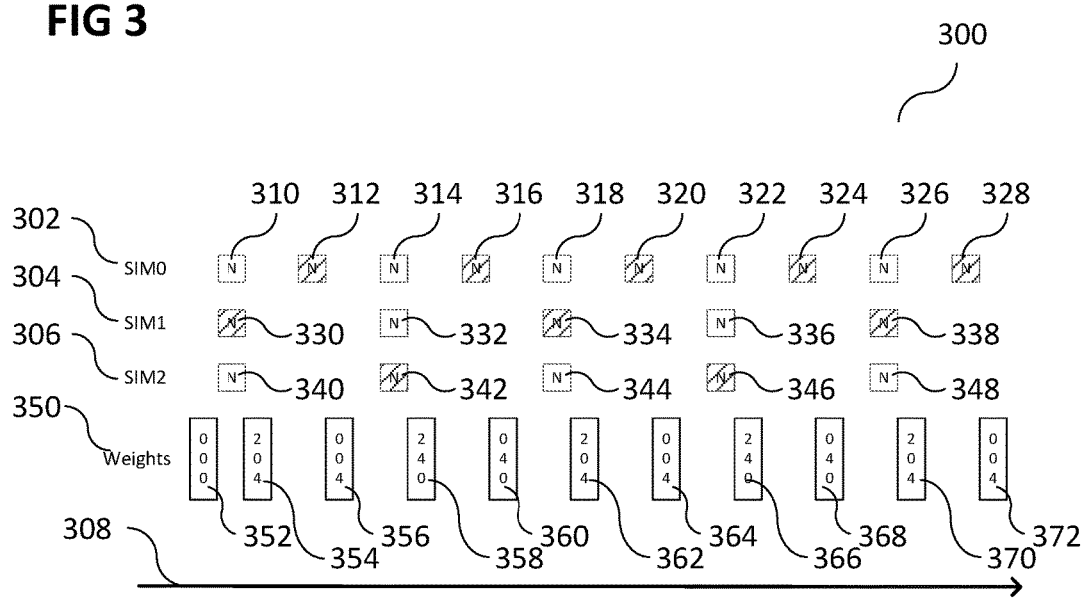
FIG. 3 shows a diagram illustrating resource distribution in a communication device using priority weights.

FIG. 3 shows a diagram 300 illustrating reception of pagings in a multi-SIM communication device (in other words: in a communication device which has a plurality of SIMs), for example a communication device with three SIMs, according to priority weights, for example using the formula given above. Time is shown as proceeding from left to right in FIG. 3, like indicated by arrow 308. Paging receptions for a first SIM (which may also be referred to as SIM0) of the communication device are shown in a first line indicated by 302. Paging receptions for a second SIM (which may also be referred to as SIM1) of the communication device are shown in a second line indicated by 304. Paging receptions for a third SIM (which may also be referred to as SIM2) of the communication device are shown in a third line indicated by 302. The first SIM may desire to receive pagings at the times indicated by boxes (labeled with 'N' which may stand for normal paging) in the first line (for example boxes 310, 312, 314, 316, 318, 320, 322, 324, 326, and 328). The second SIM may desire to receive pagings at the times indicated by boxes in the second line (for example boxes 330, 332, 334, 336, and 338). The third SIM may desire to receive pagings at the times indicated by boxes in the third line (for example boxes 340, 342, 344, 346, and 348). In FIG. 3, each of the boxes 310 to 348 may represent a time during which one of the SIMs of the communication device desires to receive a paging. An empty (or white) box may indicate that the SIM does actually not receive a paging, because another SIM receives a paging, and two SIMs may not receive a paging at the same time. A hatched box may indicate that the SIM actually receives a paging.

As will be described below, the priority weights may be used to solve the limitation of allowing only one SIM at a time to receive a paging.

For the example shown in FIG. 3, the frequencies (for example F like described in the formula above) at which the SIMs are scheduled to receive pagings are different. For example the frequency of SIM0 may be ½ (for example with respect to a pre-determined timing schedule); in other words: SIM0 may be scheduled to receive pagings every second interval. The frequency of SIM1 may be ¼ (for example with respect to the pre-determined timing schedule); in other words: SIM1 may be scheduled to receive pagings every fourth interval. The frequency of SIM2 may be ¼ (for example with respect to the pre-determined timing schedule); in other words: SIM2 may be scheduled to receive pagings every fourth interval. In other words: What is shown in FIG. 3 is an example of a scenario in Triple SIM Triple Standby. SIM0 frequency of paging may be ½, SIM1 frequency of paging may be 4 and SIM2 frequency of paging repetition may be ¼ (an actual frequency may be 1/(2*51 GSM (Global System for Mobile Communications) Frames) for SIM0, and 1/(4*51 GSM Frames) for SIM1 and SIM2, wherein a common factor may be ignored).

At times, when only one SIM desires to (or is scheduled to) receive a paging, this only one SIM may receive the paging. For example, SIM0 may be the only SIM desiring to receive pagings at times corresponding to the boxes 312, 316, 320, 324, and 328, and thus SIM0 may receive pagings at the times corresponding to the boxes 312, 316, 320, 324, and 328. In the example shown in FIG. 3, for the time periods when more than one SIM desires to receive a paging, it may be determined based on the priority weights, like indicated in the fourth line 350 of FIG. 3, which SIM may receive the paging. Furthermore, in case of equal weights, a SIM with lowest frequency may be allowed to receive the paging. In case of equal weights and equal frequency, the SIM with the lowest number (for example SIM1 instead of SIM2) may be allowed to receive the paging.

In FIG. 3, the boxes in the fourth line 350 prior to multiple paging may indicate weights and the SIMs holding highest value may be given the RF (radio frequency; for example an RF circuit) for receiving paging. For example, only one RF may be provided in the communication device which includes SIM0, SIM1, and SIM2, so that always only one of SIM0, SIM1, and SIM2 may receive a paging at a time.

For example, in an initial stage, all priority weights may be set to a predetermined initial value (which may also be referred to as reset value), for example zero. Thus, for example a vector of weights 352 may be (0,0,0).

At the time indicated by boxes 310, 330, and 340, all SIMs desire to receive a paging, and all SIMs have equal weights (of zero), and SIM1 and SIM2 have equally low frequency (of ¼), so that SIM1 may receive the paging based on the lower number (1 lower than 2), like indicated by hatched box 330. It will be understood that in another example in case of equal weights and equal frequency, the SIM which is allowed to receive the paging may be chosen randomly.

After this, the priority weight for SIM0, which desired to receive a paging but was not allowed to receive the paging, may be increased by the value corresponding to the inverse of the paging frequency of SIM0, for example 2. The priority weight for SIM2, which desired to receive a paging but was not allowed to receive the paging, may be increased by the value corresponding to the inverse of the paging frequency of SIM2, for example 4. SIM1 received the paging, and thus the priority weight for SIM2 may be set to the pre-determined reset value (for example 0). Thus, the vector of priority weights 354 may be (2, 0, 4).

In 312, SIM0 may receive a paging. Thus, the priority weight of SIM0 may be set to the pre-determined reset value. The other SIMs do not desire to receive pagings at that time, so their priority weights remain unchanged. Thus, the vector of priority weights 356 may be (0, 0, 4).

Accordingly, after SIM2 has received a paging in 342, the vector of priority weights 358 may be amended to (2, 4, 0).

Accordingly, after SIM0 has received a paging in 316, the vector of priority weights 360 may be amended to (0, 4, 0).

Accordingly, after SIM1 has received a paging in 334, the vector of priority weights 362 may be amended to (2, 0, 4).

Accordingly, after SIM0 has received a paging in 320, the vector of priority weights 364 may be amended to (0, 0, 4).

Accordingly, after SIM2 has received a paging in 346, the vector of priority weights 366 may be amended to (2, 4, 0).

Accordingly, after SIM0 has received a paging in 324, the vector of priority weights 368 may be amended to (0, 4, 0).

Accordingly, after SIM1 has received a paging in 338, the vector of priority weights 370 may be amended to (2, 0, 4).

Accordingly, after SIM0 has received a paging in 328, the vector of priority weights 372 may be amended to (0, 0, 4).

Using the priority weights to determine which SIM is allowed to receive the paging, SIM0 may be able to receive 50% of its paging and SIM1 and SIM2 may also get 50% of their paging.

A maximum consecutive paging loss per SIM in this method is guaranteed to a value equal to the number of SIMs in Multi-SIM MS (mobile station) minus one. For example for a MS with 3 SIMs, the maximum consecutive paging loss per SIM may be 2 (=3-1).

According to the devices and methods provided, fair scheduling of paging per SIM may be provided.

According to the devices and methods provided, minimal loss of paging across SIM may be provided.

The devices and methods provided may be generic for multi-SIM multi mode.

According to the devices and methods provided, scheduling may be easy and may be simply done by comparison.

The devices and methods provided may be applied to share RF for different physical channels.

Overall complexity of the devices and methods provided may be low.

Devices and methods may be provided for determining a number on which a decision may be made for scheduling. This number (for example weight or priority weight) may be designed in such a way that it takes into account of history of paging by counting loss paging and it may take into account the future occurrences of paging by including frequency (for example F like described in the formula above) in the weight.

The devices and methods provided may be implemented in Multi-SIM.

Every time when a SIM loses a paging, it may increment a consecutive page loss counter. When the reception is successfully done for paging, this counter may be reset to zero.

When there is a case of multiple SIMs expecting paging, the SIM with highest weight may be selected by using the computed weight as per the formula W=L*F as described above. F may remain the same for each SIM.

It will be understood that instead of increasing the consecutive page loss counter and upon every update multiplying the consecutive page loss counter by the inverse of the frequency to obtain the updated priority weight, the priority weight may be incremented by the inverse of the frequency, which may be cheaper in terms of computational cost. In other words, with an index "old" indicating a value before an update (for example before a missed paging), and an index "new" indicating a value after the update, instead of performing $$L_{new}=L_{old}+1, \text{ and}$$

$$W_{new}=L_{new}*F^{-1},$$

the new weight $W_{new}$ may be directly computed by $$W_{new}=W_{old}+F^{-1}.$$

Devices and methods may be provided to work at a physical layer controller of the communication device.

Although in the above an example of received paging has been described, it will be understood that priority weights may be used for any communication activity, and the paging using different SIMs is just an example for the various communication activities.

It will be understood that priority weights may also be used when the communication activities (for example paging in the example of FIG. 3) are not performed periodically; then, the weights (or priority weights) may be increased by a pre-determined number if the communication activity was desired to be performed but was not performed.

Figure 4:
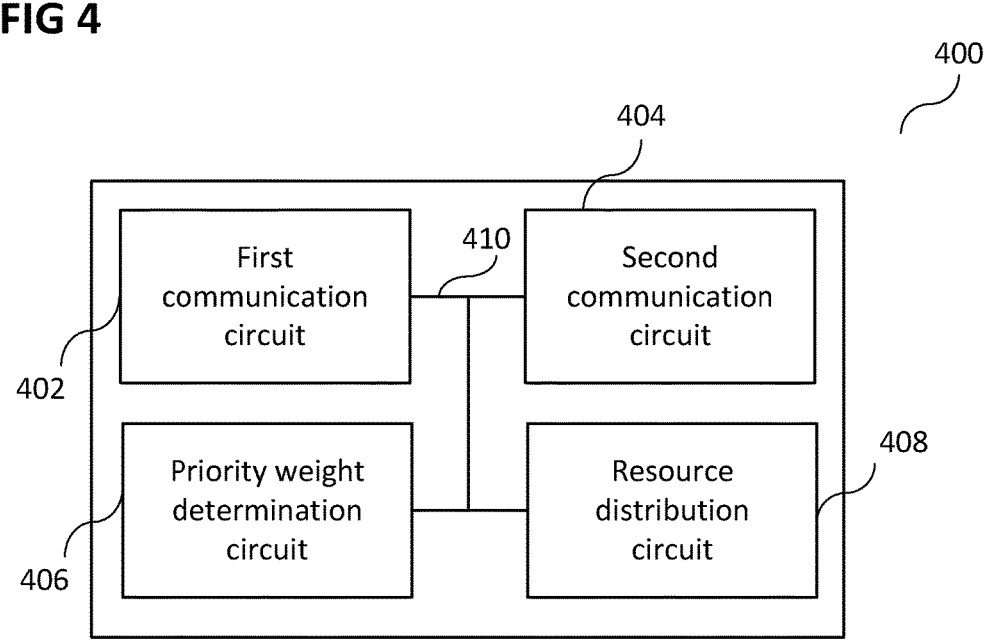
FIG. 4 shows a communication device with a first communication circuit, a second communication circuit, a priority weight determination circuit, and a resource distribution circuit.

FIG. 4 shows a communication device 400. The communication device 400 may include a first communication circuit 402 (for example a first SIM) configured to perform a first communication activity. The communication device 400 may further include a second communication circuit 404 (for example a second SIM) configured to perform a second communication activity. The communication device 400 may further include a priority weight determination circuit 406 configured to determine a first priority weight based on an activity history of the first communication circuit and configured to determine a second priority weight based on an activity history of the second communication circuit. The communication device 400 may further include a resource distribution circuit 408 configured to determine based on the first priority weight and based on the second priority weight whether the first communication circuit shall (or is allowed to) perform the first communication activity at a pre-determined point in time or whether the second communication circuit shall (or is allowed to; or is scheduled to; or is expected to) perform the second communication activity at the pre-determined point in time. The activity history of the first communication circuit 402 may include or may be information on the first communication activity performed by the first communication circuit 402 at a first plurality of points in time preceding the pre-determined point in time. The activity history of the second communication circuit 404 may include or may be information on the second communication activity performed by the second communication circuit 404 at a second plurality of points in time preceding the pre-determined point in time. The first communication circuit 402, the second communication circuit 404, the priority weight determination circuit 406, and the resource distribution circuit 408 may be coupled with each other, for example via a connection 410, for example an optical connection or an electrical connection, such as for example a cable or a computer bus or via any other suitable electrical connection to exchange electrical signals.

In other words, in the communication device 400, weights may be determined dynamically for dynamic activities (for example non-periodic activities or periodic activities) of the first circuit 402 and the second circuit 404. Then, based on the weights, priority for performing an activity may be given either to the first circuit 402 or to the second circuit 404. The resource distribution circuit 408 may thus distribute a resource of the communication device 400 (for example a shared resource, like a shared circuit, like will be described below) to the first circuit 402 and the second circuit 404.

The first communication activity may include or may be an activity according to a first radio access technology. The second communication activity may include or may be an activity according to a second radio access technology. The first radio access technology may be different from a second radio access technology, or the first radio access technology may be identical to the second radio access technology.

The first communication circuit 402 may include or may be a first subscriber identity module. The second communication circuit 404 may include or may be a second subscriber identity module. The first subscriber identity module may be different (or may be provided separately) from the second subscriber identity module.

A first plurality of time periods during which the first communication circuit 402 desires to perform the first communication activity and a second plurality of time periods during which the second communication circuit 404 desires to perform the second communication activity may overlap at least partially.

Figure 5:
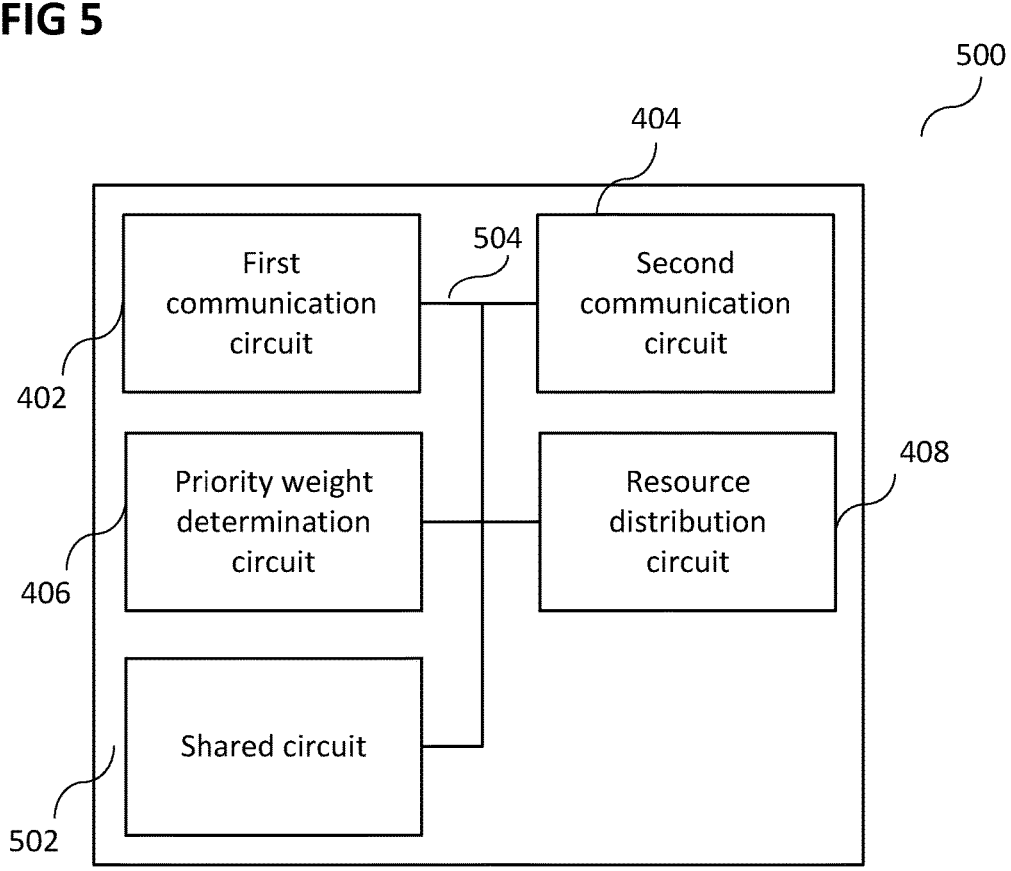
FIG. 5 shows a communication device with a first communication circuit, a second communication circuit, a priority weight determination circuit, a resource distribution circuit, and a shared circuit.

FIG. 5 shows a radio communication device 500. The radio communication device 500 may, similar to the radio communication device 400 of FIG. 4, include a first communication circuit 402. The radio communication device 500 may, similar to the radio communication device 400 of FIG. 4, further include a second communication circuit 404. The radio communication device 500 may, similar to the radio communication device 400 of FIG. 4, further include a priority weight determination circuit 406. The radio communication device 500 may, similar to the radio communication device 400 of FIG. 4, further include a resource distribution circuit 408. The radio communication device 500 may further include a shared circuit 502, like will be described below. The first communication circuit 402, the second communication circuit 404, the priority weight determination circuit 406, the resource distribution circuit 408, and the shared circuit 502 may be coupled with each other, for example via a connection 504, for example an optical connection or an electrical connection, such as for example a cable or a computer bus or via any other suitable electrical connection to exchange electrical signals.

The first communication circuit 402 may perform the first communication activity using the shared circuit 502. The second communication circuit 404 may perform the second communication activity using the shared circuit 502.

The shared circuit 502 may include or may be at least one of a subscriber identity module or a radio circuit.

The first communication activity may include or may be a periodic activity including (or having or being desired to be performed at) a first frequency. The second communication activity may include or may be a periodic activity including (or having or being desired to be performed at) a second frequency. The first frequency and the second frequency may be different. The first frequency and the second frequency may be identical. The priority weight determination circuit 460 may determine the first priority weight further based on the first frequency and may determine the second priority weight further based the second frequency.

The first priority weight may include or may be a real number. The second priority weight may include or may be a real number. The resource distribution circuit 408 may determine that the first communication circuit 402 shall perform the first communication activity at the pre-determined point in time if the first priority weight is higher than the second priority weight, and may determine that the second communication circuit 404 shall perform the second communication activity at the pre-determined point in time if the second priority weight is higher than the first priority weight.

The priority weight determination circuit 406 may set the first priority weight to a pre-determined reset value when the first communication circuit 402 performs the first communication activity. The priority weight determination circuit 406 may set the second priority weight to the pre-determined reset value when the second communication circuit 404 performs the second communication activity. The priority weight determination circuit 406 may increase the first priority weight by a first pre-determined increase value when the first communication circuit 402 desires to perform the first communication activity but the resource distribution circuit 408 determines that the second communication 404 circuit shall perform the second communication activity (in other words: the first communication circuit 402 would like to perform the first communication activity, but the resource distribution circuit gives priority to perform the second communication activity to the second communication circuit 404). The priority weight determination circuit 406 may increase the second priority weight by a second pre-determined increase value when the second communication circuit 404 desires to perform the second communication activity but the resource distribution circuit 408 determines that the first communication circuit 402 shall perform the first communication activity.

The pre-determined reset value may be any pre-determined real number, for example zero.

The first communication activity may include or may be a periodic activity including a first frequency. The second communication activity may include or may be a periodic activity including a second frequency. The first frequency and the second frequency may be different. The first frequency and the second frequency may be identical. The first pre-determined increase value may include or may be a value based on the first frequency. The second pre-determined increase value may include or may be a value based on the second frequency.

The first pre-determined increase value may be any pre-determined real number, for example the inverse of the first frequency. The second pre-determined increase value may be any pre-determined real number, for example the inverse of the second frequency.

The first communication activity and/or the second communication activity may include at least one of the following activities: transmitting data; transmitting and receiving data; receiving data; receiving paging indication data; receiving paging data; receiving extended paging data; receiving paging reorganization data; receiving system information; receiving broadcast data; and/or a polling activity.

It will be understood that the communication device may further include a third communication circuit configured to perform a third communication activity, and that the priority weight determination circuit may determine a third priority weight for the third communication circuit, and the resource distribution circuit may determine based on the first priority weight, based on the second priority weight, and based on the third priority weight, whether the first communication circuit shall perform the first communication activity, or whether the second communication circuit shall perform the second communication activity, or whether the third communication circuit shall perform the third communication activity. Likewise, the communication device may further include still further communication circuits, each configured to perform a further communication activity, and the priority weight determination circuit may determine a respective further priority weight for each of the communication circuits, and the resource distribution circuit may determine which of the communication circuits shall perform its respective communication activity.

Figure 6:
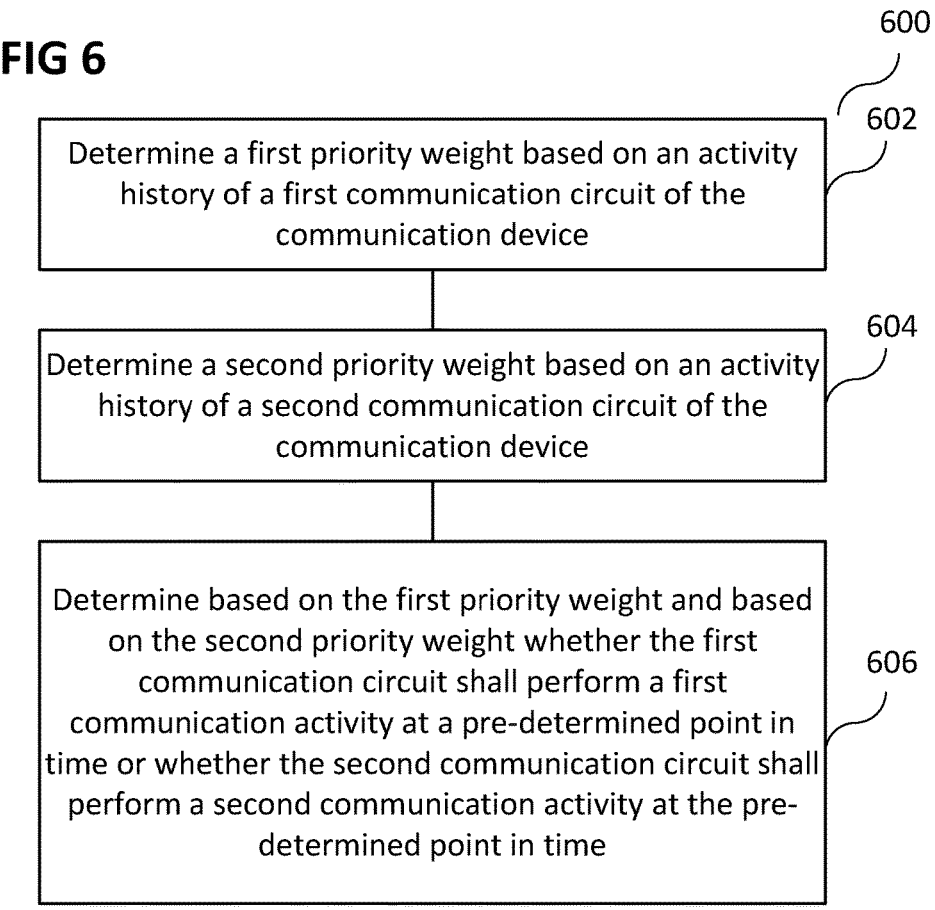
FIG. 6 shows a flow diagram illustrating a method for controlling a communication device, for example the communication device of FIG. 4.

FIG. 6 shows a flow diagram 600 illustrating a method for controlling a communication device. In 602, a priority weight determination circuit of the communication device may determine a first priority weight based on an activity history of a first communication circuit of the communication device. In 604, the priority weight determination circuit of the communication device may determine a second priority weight based on an activity history of a second communication circuit of the communication device. In 606, a resource distribution circuit of the communication device may determine based on the first priority weight and based on the second priority weight whether the first communication circuit shall perform a first communication activity at a pre-determined point in time or whether the second communication circuit shall perform a second communication activity at the pre-determined point in time. The activity history of the first communication circuit may include or may be information on the first communication activity performed by the first communication circuit at a first plurality of points in time preceding the pre-determined point in time. The activity history of the second communication circuit may include or may be information on the second communication activity performed by the second communication circuit at a second plurality of points in time preceding the pre-determined point in time.

The first communication activity may include or may be an activity according to a first radio access technology. The second communication activity may include or may be an activity according to a second radio access technology. The first radio access technology may be different from the second radio access technology, or the first radio access technology may be identical to the second radio access technology.

A first plurality of time periods during which the first communication circuit desires to perform the first communication activity and a second plurality of time periods during which the second communication circuit desires to perform the second communication activity may overlap at least partially.

The first communication circuit may perform (or desire to perform) the first communication activity using a shared circuit of the communication device. The second communication circuit may perform (or desire to perform) the second communication activity using the shared circuit.

The shared circuit may include or may be at least one of a subscriber identity module or a radio circuit.

The first communication activity may include or may be a periodic activity including a first frequency. The second communication activity may include or may be a periodic activity including a second frequency. The first frequency and the second frequency may be different. The first frequency and the second frequency may be identical. The method may further include determining the first priority weight further based on the first frequency. The method may further include determining the second priority weight further based the second frequency.

The first priority weight may include or may be a real number. The second priority weight may include or be a real number. The method may further include: determining that the first communication circuit shall perform the first communication activity at the pre-determined point in time if the first priority weight is higher than the second priority weight. The method may further include determining that the second communication circuit shall perform the second communication activity at the pre-determined point in time if the second priority weight is higher than the first priority weight.

The method may further include: setting the first priority weight to a pre-determined reset value when the first communication circuit performs the first communication activity; setting the second priority weight to the pre-determined reset value when the second communication circuit performs the second communication activity; increasing the first priority weight by a first pre-determined increase value when the first communication circuit desires to perform the first communication activity but the communication device determines that the second communication circuit shall perform the second communication activity; and increasing the second priority weight by a second pre-determined increase value when the second communication circuit desires to perform the second communication activity but the communication device determines that the first communication circuit shall perform the first communication activity.

The pre-determined reset value may be any pre-determined real number, for example zero.

The first communication activity may include or may be a periodic activity including a first frequency. The second communication activity may include or may be a periodic activity including a second frequency. The first frequency and the second frequency may be different. The first frequency and the second frequency may be identical. The first pre-determined increase value may include or may be a value based on the first frequency. The second pre-determined increase value may include or may be a value based on the second frequency.

The first pre-determined increase value may be any pre-determined real number, for example the inverse of the first frequency. The second pre-determined increase value may be any pre-determined real number, for example the inverse of the second frequency.

The first communication activity and/or the second communication activity may include or may be at least one of the following activities: transmitting data; transmitting and receiving data; receiving data; receiving paging indication data; receiving paging data; receiving extended paging data; receiving paging reorganization data; receiving system information; receiving broadcast data; and/or a polling activity.

It will be understood that the communication device may further include a third communication circuit configured to perform a third communication activity, and that the priority weight determination circuit may determine a third priority weight for the third communication circuit, and the resource distribution circuit may determine based on the first priority weight, based on the second priority weight, and based on the third priority weight, whether the first communication circuit shall perform the first communication activity, or whether the second communication circuit shall perform the second communication activity, or whether the third communication circuit shall perform the third communication activity. Likewise, the communication device may further include still further communication circuits, each configured to perform a further communication activity, and the priority weight determination circuit may determine a respective further priority weight for each of the communication circuits, and the resource distribution circuit may determine which of the communication circuits shall perform its respective communication activity.

Figure 7:
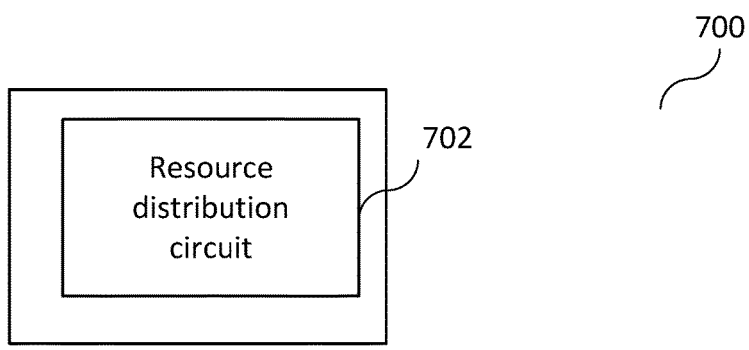
FIG. 7 shows a communication device with a resource distribution circuit.

FIG. 7 shows a communication device 700, The communication device 700 may include a resource distribution circuit 702 configured to determine based on a first activity history, including information on a communication activity of a first communication circuit at a first plurality of points in time, and based on a second activity history, including information on a communication activity of a second communication circuit at a second plurality of points in time, whether the first communication circuit shall perform the first communication activity or whether the second communication circuit shall perform the second communication activity.

The first communication activity may include or may be an activity according to a first radio access technology. The second communication activity may include or may be an activity according to a second radio access technology, which may be different from the first radio access technology or may be identical to the first radio access technology.

Figure 8:
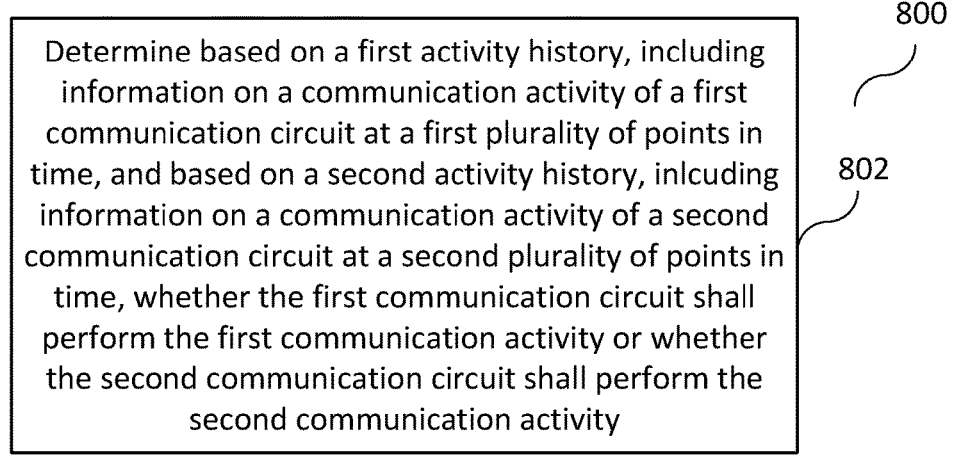
FIG. 8 shows a flow diagram illustrating a method for controlling a communication device, for example the communication device of FIG. 7.

FIG. 8 shows a flow diagram 800 illustrating a method for controlling a communication device. In 802, a resource distribution circuit of the communication device may determine based on a first activity history, including information on a communication activity of a first communication circuit at a first plurality of points in time, and based on a second activity history, including information on a communication activity of a second communication circuit at a second plurality of points in time, whether the first communication circuit shall perform the first communication activity or whether the second communication circuit shall perform the second communication activity.

The first communication activity may include or may be an activity according to a first radio access technology. The second communication activity may include or may be an activity according to a second radio access technology, which may be different from the first radio access technology or may be identical to the first radio access technology.

Any one of the communication devices described above may be configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((High PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), DataTAC, iDEN (Integrated Digital Enhanced Network), PDC (Personal Digital Cellular), PHS (Personal Handy-phone System), WiDEN (Wideband Integrated Digital Enhanced Network), iBurst, Unlicensed Mobile Access (UMA, also referred to as 3GPP Generic Access Network, or GAN standard).

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuitry for a communication device, the circuitry comprising:
   a processor configured to determine whether a first subscriber identity module is to receive a paging message based on a first priority or a second subscriber identity module is to receive a paging message based on a second priority during a paging period,
   wherein the first priority is a number of blockings of paging messages of the first subscriber identity module; and
   wherein the second priority is a number of blockings of paging message of the second subscriber identity module;
   wherein the processor is further configured to increment the first priority for the first subscriber identity module or the second priority for the second subscriber identity module when the first subscriber identity module or the second subscriber identity module had a paging message blocked.

2. The circuitry of claim 1,
   wherein the processor is further configured to reset the first priority for the first subscriber identity module or the second priority for the second subscriber identity module to a predetermined reset value when the first subscriber identity module or the second subscriber identity module receives a paging message successfully.

3. The circuitry of claim 2,
   wherein the predetermined reset value is zero.

4. The circuitry of claim 1,
   wherein the first priority is further based on a frequency of paging message reception of the first subscriber identity module; and
   wherein the second priority is further based on a frequency of paging message reception of the second subscriber identity module.

5. The circuitry of claim 1, further comprising
   a radio frequency circuit to receive paging messages for the first subscriber identity module and the second subscriber identity module.

6. A circuitry for a communication device, the circuitry comprising:
   a first subscriber identity module configured to receive a first paging message;
   a second subscriber identity module configured to receive a second paging message;
   a processor configured to
      determine a first priority based on an activity history of the first subscriber identity module and determine a second priority based on an activity history of the second subscriber identity module; and
      determine based on the first priority and based on the second priority whether the first subscriber identity module is to receive the first paging message at a pre-determined point in time or whether the second subscriber identity module is to receive the second paging message at the pre-determined point in time;
   wherein the activity history of the first subscriber identity module comprises information on the first paging messages received by the first subscriber identity module at a first plurality of points in time preceding the pre-determined point in time; and
   wherein the activity history of the second subscriber identity module comprises information on the second paging messages received by the second subscriber identity module at a second plurality of points in time preceding the pre-determined point in time.

7. The circuitry of claim 6,
   wherein the first priority comprises a number counting blocked paging messages of the first subscriber identity module; and
   wherein the second priority comprises a number counting blocked paging messages of the second subscriber identity module.

8. The circuitry of claim 6,
   wherein the processor is further configured to increment a consecutive page loss counter for the first subscriber identity module or the second subscriber identity module when the first subscriber identity module or the second subscriber identity module loses a paging message.

9. The circuitry of claim 6,
   wherein the processor is further configured to reset the consecutive page loss counter for the first subscriber identity module or the second subscriber identity module to a predetermined reset value when the reception of a paging message is successfully done by the first subscriber identity module or the second subscriber identity module.

10. The circuitry of claim 9,
    wherein the predetermined reset value is zero.

11. The circuitry of claim 6,
    wherein the first priority is further based on a frequency of paging message reception of the first subscriber identity module; and
    wherein the second priority weight is further based on a frequency of paging message reception of the second subscriber identity module.

12. The circuitry of claim 6, further comprising
    a radio frequency circuit to receive paging messages for the first subscriber identity module and the second subscriber identity module.

13. The circuitry of claim 6,
wherein a first plurality of time periods during which the first subscriber identity module desires to receive the first paging message and a second plurality of time periods during which the second subscriber identity module desires to receive the second paging message at least partially overlap.

14. A communication device, comprising:
a radio frequency circuit to receive paging messages;
a first subscriber identity module configured to receive a first paging message;
a second subscriber identity module configured to receive a second message;
a processor configured to
  determine a first priority based on an activity history of the first subscriber identity module and determine a second priority based on an activity history of the second subscriber identity module; and
  determine based on the first priority and based on the second priority whether the first subscriber identity module is to receive the first paging message at a pre-determined point in time or whether the second subscriber identity module is to receive the second paging message at the pre-determined point in time;
wherein the activity history of the first subscriber identity module comprises information on the first paging messages received by the first subscriber identity module at a first plurality of points in time preceding the pre-determined point in time; and
wherein the activity history of the second subscriber identity module comprises information on the second paging messages received by the second subscriber identity module at a second plurality of points in time preceding the pre-determined point in time.

15. The communication device of claim 14,
wherein the first priority comprises a number counting blocked paging messages of the first subscriber identity module; and
wherein the second priority comprises a number counting blocked paging messages of the second subscriber identity module.

16. The communication device of claim 14,
wherein the processor is further configured to increment a consecutive page loss counter for the first subscriber identity module or the second subscriber identity module when the first subscriber identity module or the second subscriber identity module loses a paging message.

17. The communication device of claim 14,
wherein the processor is further configured to reset the consecutive page loss counter for the first subscriber identity module or the second subscriber identity module to a predetermined reset value when the reception of a paging message is successfully done by the first subscriber identity module or the second subscriber identity module.

18. The communication device of claim 17,
wherein the predetermined reset value is zero.

19. The communication device of claim 14,
wherein the first priority is further based on a frequency of paging message reception of the first subscriber identity module; and
wherein the second priority is further based on a frequency of paging message reception of the second subscriber identity module.

20. The communication device of claim 14,
wherein a first plurality of time periods during which the first subscriber identity module desires to receive the first paging message and a second plurality of time periods during which the second subscriber identity module desires to receive the second paging message at least partially overlap.

21. One or more non-transitory computer-readable media storing instructions thereon that, when executed by at least one processor, direct the at least one processor to perform a method, comprising:
  determining whether a first subscriber identity module is to receive a paging message or whether a second subscriber identity module is to receive a paging message based on a first priority and a second priority,
  wherein the first priority is a number of blockings of paging messages of the first subscriber identity module; and
  wherein the second priority is a number of blockings of paging message of the second subscriber identity module; and
  incrementing the first priority for the first subscriber identity module or the second priority for the second subscriber identity module when the first subscriber identity module or the second subscriber identity module had a paging message blocked.

22. A circuitry for a communication device, the circuitry comprising:
  a processor configured to determine whether a first subscriber identity module is to receive a paging message based on a first priority or a second subscriber identity module is to receive a paging message based on a second priority during a paging period,
  wherein the first priority is related to a number of blockings of paging messages of the first subscriber identity module; and
  wherein the second priority is related to a number of blockings of paging message of the second subscriber identity module;
  wherein the processor is further configured to increment the first priority for the first subscriber identity module or the second priority for the second subscriber identity module when the first subscriber identity module or the second subscriber identity module had a paging message blocked.

* * * * *